July 4, 1961

W. P. PLACE 2,991,397

PROTECTIVE SYSTEM FOR DETECTING BREAKDOWN
RESISTANCE THAT WOULD CAUSE A SHORT OR
GROUND OF A POWER CIRCUIT

Filed Oct. 31, 1957

INVENTOR.
WILLARD PORTER PLACE
BY
William D. Carothers
HIS ATTORNEY

United States Patent Office 2,991,397
Patented July 4, 1961

2,991,397
PROTECTIVE SYSTEM FOR DETECTING BREAKDOWN RESISTANCE THAT WOULD CAUSE A SHORT OR GROUND OF A POWER CIRCUIT
Willard Porter Place, Irwin, Pa., assignor to Femco, Inc., Irwin, Pa., a corporation of Pennsylvania
Filed Oct. 31, 1957, Ser. No. 693,766
8 Claims. (Cl. 317—29)

This invention relates generally to protective systems for power circuit lines and more particularly to a high frequency check circuit that interrupts the power circuit line when the resistance between individual lines threatens a short or ground.

This invention is particularly adaptable for protecting cables or mine transmission lines supplying unidirectional current to mobile machines such as mining machines, shuttle cars, loading and conveying machines, or the like, above or below the surface of the ground. These power circuits are usually for unidirectional current for such machines. Unidirectional current power circuits have one line that is a ground wire, whether in a cable or suspended as a transmission line. The cable may be supported on hangers along the mine wall or lie on the floor of the mine or lay along hangers, attached to the equipment such as along a conveyor train or the like. Whether the power circuit is three separate lines or a cable and regardless of how or where it is supported, the atmospheric conditions, the vibrating conditions ordinarily known in a mine are very hard on insulated wire. If it is on the ground a vehicle may run over the same causing damage. Any damage to the insulation reduces the resistance between the lines or line and ground. If the power supply can be cut off from the power circuit before this reduced resistance permits a short circuit or ground of the unidirectional current can occur, then there is no likelihood of damage to the cable or an electric spark that would disturb the dust and create an explosion. When the insulation resistance is lowered the problem then is to open the circuit breaker feeding the unidirectional power circuit before a short can occur. This can be accomplished by supplying a high frequency thereto and shortening the ends of the lines to this high frequency by connecting them with condensers and by inserting in these lines inductances that pass the unidirectional current but make the line effectively longer for the high frequency current. Thus a reduction of the resistances between the lines or a line and ground shortens the effective length of this high frequency line and any relays energized by the high frequency are obviously shorted out or their power supply is so diminished that the relay drops out. Then the relay energized by high frequency may cut out the unidirectional power circuit long before the leakage resistance between lines or a line and ground drops low enough to permit the unidirectional current to leak, short or otherwise arc or burn. A leakage of the power circuit lines that will effectively short the high frequency current therein will not harm the high frequency control, yet the leakage is far from permitting a short of the unidirectional power current that would cause damage.

Other objects and advantages appear hereinafter in the following description and claims.

The accompanying drawings show for the purpose of exemplification without limiting this invention or claims thereto, certain practical embodiments illustrating the principles of this invention; wherein, FIG. 1 is a circuit diagram of a power circuit having an inductance at each end of each line.

Figure 1:
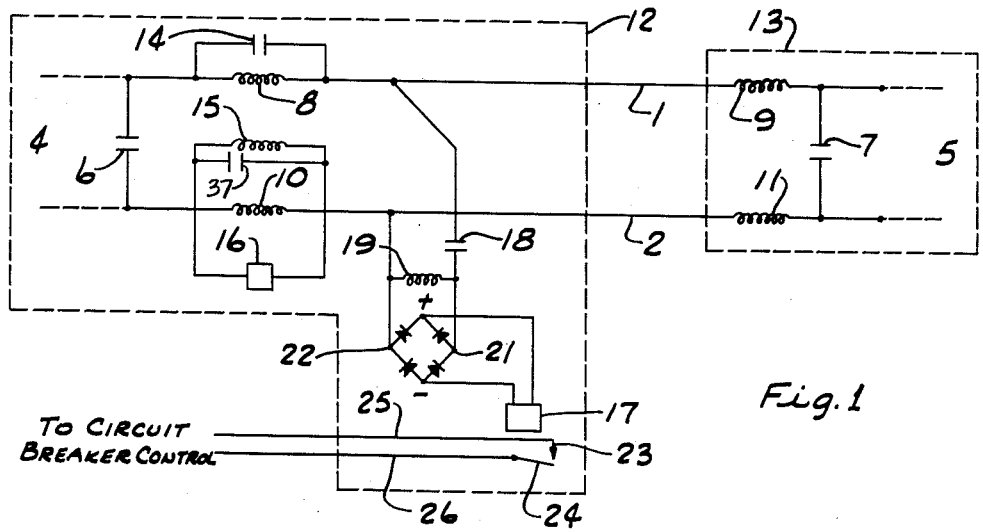

Referring to FIG. 1 of the drawings, the power circuit lines are indicated at 1 and 2 that extend from the power supply end 4 to the machine or consuming or load end 5. The two wire forming lines 1 and 2 may be in a cable or supported at a transmission line to a specific section of the distribution system such as, for example, may be in a mine. A circuit breaker, not shown, would control the current supplied at 4 and this circuit breaker would have a control circuit. The circuit breaker would be set or the power circuit fused to pass sufficient current for maximum load to the machines and equipment at peak loads. This normal current load would be much greater than an initial leakage current due to an insulation fault. This damage could occur without protection from the circuit breaker.

A high frequency current in the range of 100 kc., if induced in the supply end of the circuit, would meet with a high impedance if the length of the line is about one-fourth the wave length of the high frequency. In order to confine this high frequency to the line or cable to be protected a capacitance in the form of the capacitors or condensers 6 and 7 are connected across the end of the lines 1 and 2, then short-circuiting these lines insofar as the high frequency is concerned.

To artificially build up the effective length of this cable or line, it is necessary to add inductance to the power circuit. As shown in FIG. 1 this inductance is added adjacent to the machine end of each line by inserting in line 1 the inductor or inductance coil 9, and in line 2 the inductance coil 11. By placing these inductor coils adjacent to the ends of the lines where they will have the protection of an enclosure 13 at the machine or consuming end 5, the vulnerable portion of the line or cable is that which extends therebetween which must be constantly checked for failures in insulation.

Thus the lines 1 and 2 having the inductance coils 9 and 11 therein and shorted by the condensers 6 and 7 at the ends of the power circuit provides in effect an artificial high frequency line of several hundred feet, yet the actual length of the lines 1 and 2 may be only 100 feet.

To apply the high frequency to the lines 1 and 2 the inductances 8 and 10 are inserted therein and each coil 8 and 10 has a tuning condenser 14 and 37 placed in multiple therewith to provide a circuit tuned to resonance. These inductances 8 and 10 are coupled with the output inductance 15 of the oscillator 16 that is tuned to provide the same frequency which for assumption could be 100 kc., thus the lines 1 and 2 which carry the unidirectional current for the power circuit also provide a closed circuit for the high frequency current, and when this is applied to the feed end the line may have an impedance of approximately 1500 ohms. If a shunt of 100 ohms is placed across the lines 1 and 2 the impedance of this circuit would drop from 1500 ohms to about 100 ohms which difference is employed to control the safety of this line.

A high resistance relay 17 has its operating coil connected to the lines 1 and 2 through the filter network in the form of the series condenser 18 and the multiple impedance 19 and the bridge rectifier 20 interposed therebetween. Line 1 is connected through the condenser 18 to the A.C. point 21 of the bridge rectifier 20.

The opposite A.C. point 22 is connected directly to line 2 and the impedance 19 is actually connected across the A.C. points 21 and 22 of the bridge rectifier 20. The condenser 18 blocks the passage of the unidirectional current, and if it has a ripple thereon, as when supplied with direct current from disc type rectifiers, then the filter formed by the condenser 18 and the impedance 19 will allow only frequencies on the order of 100 kc. to be applied to points 21 and 22 of the bridge rectifier, which rectifies the same and energizes the high resistance relay 17. Any reduction in the impedance of this power circuit will assume most of the high frequency output and thus rob the energy that maintains the high resistance relay 17 energized resulting in its deenergization, even though there is no leakage of the unidirectional current from the power circuit.

The relay 17 is provided with the front contact 23 that is engaged by the movable or heel contact 24 when relay 17 is energized. The heel or movable contact 24 and the front contact 23 are employed in an energizing circuit through the hold-in coil of the circuit breaker, not shown, supplying the unidirectional current to the supply end 4 of the power circuit formed by the lines 1 and 2. The control of circuit breakers or the circuit breakers themselves do not form a part of this invention and they are well known in the art. Thus the control lines 25 and 26 from the contacts 23 and 24 of the relay 17 interrupt the holding device of the circuit breaker to open the same when the impedance of the power circuit to the high frequency current has been lowered to a point where it may be dangerous to the unidirectional current of that circuit.

Figure 2:
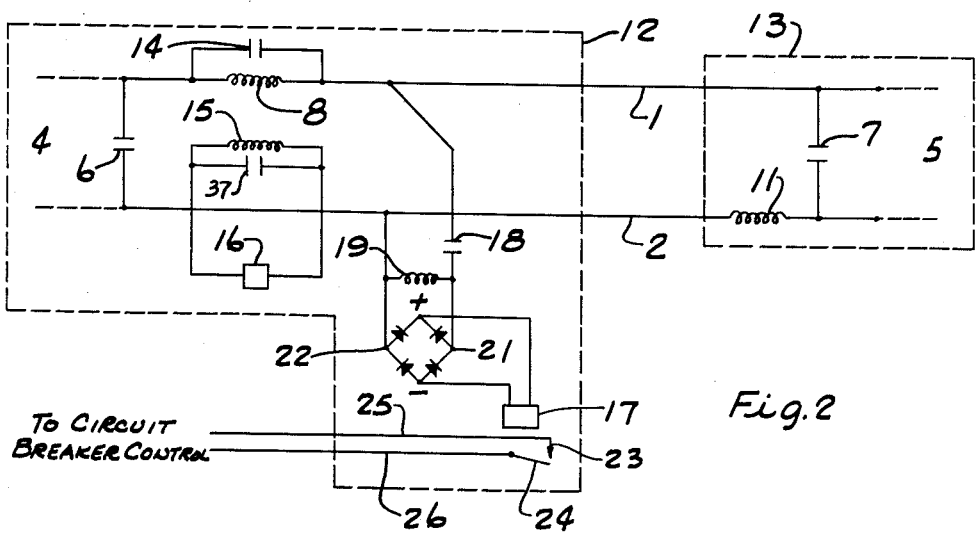
FIG. 2 is a circuit diagram of a power circuit having one inductance in each line.

In the circuit diagram of FIG. 2, the impedances 9 and 10 have been omitted from the lines 1 and 2 respectively. One impedance only, such as the impedance 8, may be all that is necessary to provide the artificial line. In FIG. 2 there are only two impedances. But otherwise the circuit and its total function is the same as that shown in FIG. 1. In FIG. 1 the output coil 15 may be coupled with both coils 8 and 10, or with coil 8 alone, but there should be a very loose coupling between coil 8 and coil 10. In FIG. 2 coils 9 and 10 have been eliminated so the loose coupling between adjacent coils in the power circuit.

It is possible to employ one impedance 8 for building up the whole of the artificial high frequency line. Thus a proper impedance and the two capacitances 6 and 7 produces the artificial high frequency line and the filter of the impedance 19 and the condenser 18 to filter out ripple and any other improper signals permits the high frequency current to be rectified by the bridge rectifier and supplied to the high resistance relay 17 to maintain or open the circuit breaker hole in circuit through its front and heel contacts 23 and 24 in all of the circuits shown.

Figure 3:
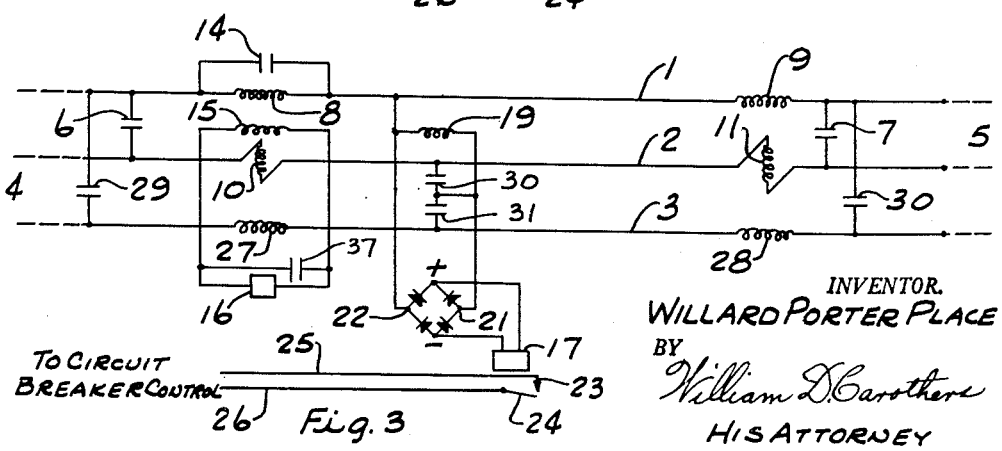
FIG. 3 is a circuit diagram of a three wire power circuit with an inductance at each end of each line.

The circuit of FIG. 3 shows a multiple wire power circuit which may be circuits for two machines, a circuit with different voltages for one machine, and any number of other different uses. In FIG. 3 the three wire power circuit with lines 1, 2 and 3 are each provided with inductance coils at each of their ends, the lines 1 and 2 having the coils 8, 9, 10, and 11 while the line 3 has the coils 27 and 28 at its opposite ends. The line 3 is provided with the high frequency short-circuiting condensers 29 and 30 connected between lines 1 and 3.

It is not necessary to have condensers between lines 2 and 3 since the filter condensers 30 and 31 are connected in series between these lines and their intermediate connection is connected to point 21. Otherwise the circuit is the same as that in FIGS. 1 and 2. To clearly show that the coupling between inductance coils 8, 10 and 27 and between 9, 11 and 28 should be loose or ineffective, the intermediate coils 10 and 11 have been shown with their axes at right angles to the axes of the other coils.

I claim:
1. A direct current power line protective system for actuating a circuit breaker supplying the power line with direct current, consisting of a power line having a power supply end and a load end, at least one inductor in each line capable of passing the direct current to increase the effective length of said power line to high frequency, at least one of said inductors being in different lines at opposite ends of said power line, a capacitor connected to one of said inductors at said power supply end to tune the same to a predetermined high frequency, an oscillator having its output coupled with said tuned inductor to deliver said high frequency to said power line, a capacitor across said power line at the power supply end and load end thereof to complete the high frequency circuit in said power line, a control relay at said power supply end of said power line having a front contact in the control circuit of the circuit breaker to open the latter if said relay is deenergized, a bridge rectifier having its direct current positions connected to said control relay and its alternating current positions connected across said power line, a capacitor connected between one power line and one of said alternating current positions of said rectifier, an inductor connected across said alternating current positions of said rectifier to energize said control relay by said high frequency circulating in said power line, a leakage in said power line less than the normal direct current supply effective in shorting the supply of high frequency current and deenergizing said control relay to open said front contact causing the circuit breaker to open said power line.

2. A protective system comprising a direct current power supply, a load, power lines connecting said power supply and said load, a controlled circuit breaker between said power lines and said power supply, an inductor in each of said power lines capable of passing direct current to increase the effective length of said power lines to high frequency current, a capacitor connected across one inductor adjacent the power supply end to tune said inductor to a given high frequency, an oscillator of the same high frequency having its output coupled with said tuned inductor to energize said power lines with high frequency, a capacitor connecting said power lines at the power supply end and at the load end to form a closed high frequency circuit for their full length, a control relay at the power supply end having a front contact in the control of said circuit breaker to open the same, a filter connected to said closed high frequency circuit at the power supply end to pass only the high frequency current, a rectifier connected between said filter and said control relay to energize the latter from the filtered rectified high frequency current, the lowering of the resistance between said power lines short-circuiting the high frequency current therein to deenergize said control relay causing said front contact to open and break the control of said circuit breaker to interrupt the flow of direct current to said power lines.

3. The protective system of claim 2 characterized in that there is only one inductor in each line of said power lines.

4. The protective system of claim 3 characterized in that said inductors in adjacent power lines are at opposite ends of said power lines from each other.

5. The protective system of claim 2 characterized in that there are only two lines in said power lines.

6. The protective system of claim 2 characterized in that there are two inductors in each line of said power lines.

7. A protective system comprising a direct current power supply, a load, three power lines connecting said power supply and said load, a controlled circuit breaker between said power lines and said power supply, an inductor in each of said three power lines capable of passing direct current to increase the effective length of said power lines to high frequency current, a capacitor connected across one inductor adjacent said power supply end to tune said inductor to a given high frequency, an oscillator of the same high frequency having its output coupled with said tuned inductor to energize said three power lines with high frequency, a capacitor connecting one line and each of the other two lines of said three power lines at the power supply end and at the load end thereof to form a closed high frequency circuit for their full length, a control relay at the power supply end having a front contact in the control of said circuit breaker to open the same, a filter connected to said closed high frequency circuit at the power supply end to pass only high frequency current, a rectifier connected between said filter and said control relay to energize the latter from the filtered rectified high frequency current, the lowering of the resistance between said three power lines short-circuiting the high frequency current therein to deenergize said control relay causing said front contact to open and break the control of said circuit breaker to interrupt the flow of direct current to said three power lines.

8. The protective system of claim 7 characterized in that said filter includes an inductor connected between said one power line and one of the alternating current positions of said rectifier, and a capacitor connected between each of the other two power lines and to said alternating current position of said rectifier.

References Cited in the file of this patent

UNITED STATES PATENTS

| | | |
|---|---|---|
| 1,831,338 | Brown | Nov. 10, 1931 |
| 2,525,393 | Blackburn | Oct. 10, 1950 |
| 2,528,237 | McConnell | Oct. 31, 1950 |
| 2,677,014 | Moznihan | Apr. 27, 1954 |
| 2,874,337 | Sorensen | Feb. 17, 1959 |

FOREIGN PATENTS

| | | |
|---|---|---|
| 637,392 | Great Britain | May 17, 1950 |